(12) United States Patent
Schoettle et al.

(10) Patent No.: US 11,344,154 B1
(45) Date of Patent: May 31, 2022

(54) ADJUSTABLE HEIGHT GRILL TOP

(71) Applicants: Steven J. Schoettle, Saint Simons Island, GA (US); Randie A. Whisenant, Brunswick, GA (US)

(72) Inventors: Steven J. Schoettle, Saint Simons Island, GA (US); Randie A. Whisenant, Brunswick, GA (US)

(*) Notice: Subject to any disclaimer, the term of this patent is extended or adjusted under 35 U.S.C. 154(b) by 249 days.

(21) Appl. No.: 16/778,428

(22) Filed: Jan. 31, 2020

Related U.S. Application Data (63) Continuation-in-part of application No. 15/349,686, filed on Nov. 11, 2016, now Pat. No. 10,598,383.

(51) Int. Cl.
  *F24B 1/18* (2006.01)
  *A47J 37/07* (2006.01)

(52) U.S. Cl.
  CPC ....... *A47J 37/0786* (2013.01); *A47J 37/0704* (2013.01)

(58) Field of Classification Search
  CPC .......................... A47J 37/0786; A47J 37/0704
  USPC ......................................................... 126/30
  See application file for complete search history.

(56) References Cited

U.S. PATENT DOCUMENTS

| | | | | | |
|---|---|---|---|---|---|
| 2,764,223 | A | * | 9/1956 | Mischke | A47C 3/18 248/418 |
| 2,844,139 | A | * | 7/1958 | Lucas | A47J 33/00 126/30 |
| 2,912,973 | A | * | 11/1959 | Lucas | A47J 37/0763 126/30 |
| 3,067,734 | A | * | 12/1962 | Lucas | A47J 37/0763 126/30 |
| 3,152,536 | A | * | 10/1964 | Lucas | A47J 37/0763 99/397 |
| 3,632,085 | A | * | 1/1972 | Traywick | B66F 5/04 254/1 OB |
| 3,825,228 | A | * | 7/1974 | Greutman | E04H 17/266 254/237 |
| 4,248,405 | A | * | 2/1981 | Kameda | B66F 5/04 254/1 OB |

* cited by examiner

*Primary Examiner* — Steven B McAllister
*Assistant Examiner* — John E Bargero
(74) *Attorney, Agent, or Firm* — Jonathan Rigdon Smith, J.D.; Jonathan R. Smith (57) ABSTRACT

A grill top that can be removably attached to a barbecue grill fire basin has a lever that adjusts the height of the rack above the fire basin. The lever handle is located well away from the fire. A ratchet mechanism holds the rack at a selected height, and parallelogram bars maintain the rack in a horizontal orientation.

10 Claims, 6 Drawing Sheets

ADJUSTABLE HEIGHT GRILL TOP

CROSS-REFERENCES TO RELATED APPLICATIONS

This application for utility patent claims priority of U.S. patent application Ser. No. 15/349,686, filed Nov. 11, 2016.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

REFERENCE TO A BIOLOGICAL SEQUENCE LISTING

Not applicable.

BACKGROUND OF INVENTION

Field of the Invention

This invention is in the field of supports, more specifically in the field of cooking grill tops, more specifically in the field of barbecue grill tops, and still more specifically in the field of grill tops that are adjustable and/or removable from the fire basin of a grill.

Description of the Related Art

In common usage, and particularly in the following description, a barbecue or cooking "grill" refers to an entire apparatus for cooking foodstuffs. The basic sub-components are: the fire box or bowl, which holds the fuel itself or burners, herein called a "fire basin" or "basin," and the grid for supporting the food above the fire, herein called a "grill rack." The entire apparatus connecting the grill rack to the basin and supporting it thereon is called the "grill top."

In many grills, the grill rack may be removable (for cleaning, for example) but is in a fixed position relative to the source of heat. Such grills adjust the heat applied to the food by adjusting the intensity of the fire rather than the position of the food relative to the fire. If the fire is produced by an adjustable fuel such as propane, the application of heat to the food generally does not require moving the food towards or away from the fire. With a charcoal or wood fire, on the other hand, fuel adjustment is often too slow, and quick movement of the food may be necessary.

Some grills, such as the Marsh Allen Cast Iron Hibachi Charcoal Grill Model 30052 by Kay Home Products of Antioch, Illinois, allow a grill rack to be raised and lowered by providing grill rack-supporting vertical bars at the back of the grill. Pairs of notches are cast into these bars, which engage and hold the rear edge of the grill rack. A user grasps a handle on the front of the grill rack and lifts the entire grill rack, along with the food, out of one pair of notches, and reinserts the rear of the grill rack into another pair of higher or lower notches. The drawback here is that the grill racks are necessarily small so that a user can handle the entire weight. [0009] Another type of grill that moves the food relative to the fire is represented by U.S. Pat. No. 3,126,881 to Blotsky. It has a central grill rack-bearing mast that can be raised and lowered by a lever below the grill. In Blotsky, the lever is pivoted up and down by a threaded crank mounted at the side of the grill. Such an arrangement can handle somewhat larger weight, but has the drawback that when the mechanism is eventually contaminated by ash and dirt, it will be hard to operate and difficult to clean.

BRIEF DESCRIPTION OF THE INVENTION

Objects of the Invention

The principal object of the invention is to allow a large and/or heavy grill rack of food to be adjusted in height above the fire with little effort. Another object of the invention is to provide such an adjustment means that can be fixed, or removably attached, to a variety of grills or fire basins.

SUMMARY OF THE INVENTION

The present invention is a grill top that can be removably attached to a barbecue grill fire basin, comprising a lever that adjusts the height of the grill rack above the fire basin. The lever handle is located well away from the fire. A ratchet mechanism holds the grill rack at a selected height, and an arrangement of parallelogram bars maintains the grill rack in a horizontal orientation. The lever has a fulcrum that is near the edge of the fire basin. Downward pressure on the lever handle supports the weight of the grill rack and the food. The length of the handle allows the user to adjust the grill rack height with a small amount of downward pressure. The grill rack is connected to the lever by the parallelogram bars. One or more ratchet bars set the height of the grill rack by fixing the distance between the parallelogram bars. The ratchet bar or bars self-engage the parallelogram bars under their own weight. A user can easily disengage the ratchet bar or bars by pushing a corresponding tab or tabs.

These and other benefits will be more clearly illustrated in the following detailed description and drawings.

DETAILED DESCRIPTION OF THE INVENTION

Figure 1:
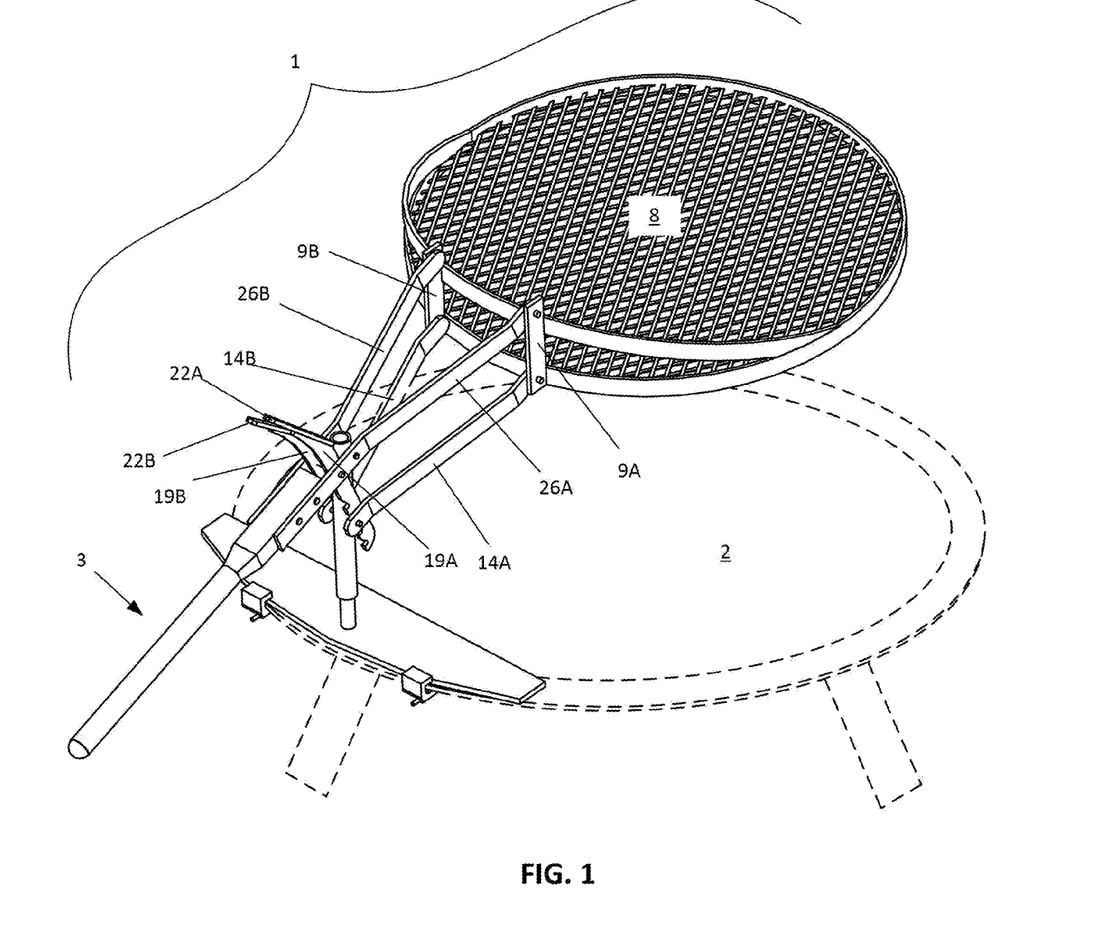
FIG. 1 is an oblique view of the preferred embodiment of the invention.

Referring now to the drawings, in which like reference characters refer to like elements among the drawings, FIG. 1 is an oblique view of the preferred embodiment of the invention 1 attached to a fire basin 2 (shown in dashed lines to indicate environmental structure). The invention is roughly vertically bilaterally symmetrical about a handle member 3, defining a right side to the lower right and a left side to the upper left in this view. In this description, the letter "A" after any numerical index refers to an element on the right side and the letter "B" refers to a corresponding element on the left side.

A grill rack 8 for holding food for cooking is supported over the fire basin 2. The principal right and left elements of the invention, the functionality of which are more fully explained below, are: vertical lift members 9A and 9B; ratchet bars 13A and 13B; parallelogram bars 14A and 14B; tabs 22A and 22B; and inner handle member ends 26A and 26B.

Figure 2:
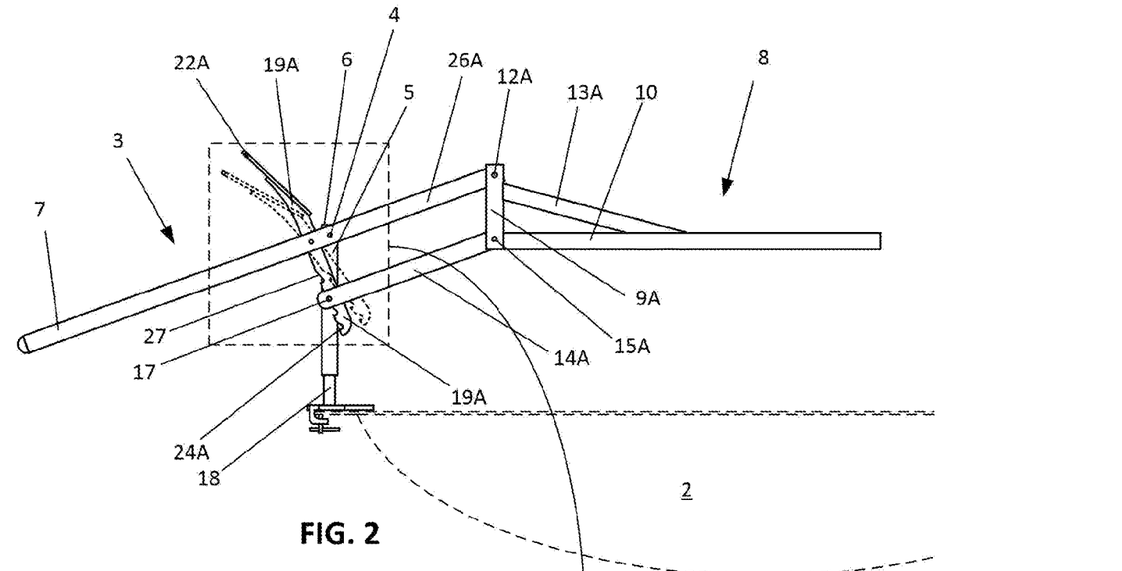
FIG. 2 is a side view of the preferred embodiment.

FIG. 2 is a right side view of the preferred embodiment of the invention. The handle member 3 pivots, in a vertical plane, on a fulcrum pin 4 on the upper portion 5 of a vertical member, a hollow cylindrical collar 6. The fulcrum pin 4 (common to the right and left sides of the invention) is the first pivot point of a parallelogram arrangement designed to maintain the grill rack 8 in a horizontal orientation. At the outer end of handle member 3 in this view ("outer" meaning away from the grill rack 8) is a handle 7. The grill rack 8 is attached to the inner end 26 of the handle member 3 by means of a right vertical lift member 9A attached to the periphery 10 of the grill rack 8. The inner end 26A of the handle member 3 ("inner" meaning closer to the grill rack 8) is pivotably attached to the right vertical lift member 9A by a second pin at second pivot point 12A. A grill rack brace 13A is fixed between the top end of the vertical lift member 9A and at least one point on the periphery 10 of the grill rack 8 to reduce bending moment at the joint between the vertical lift member 9A and the periphery 10. The scope of this invention includes equivalent bracing means. A right parallelogram bar 14A is pivotably attached at its inner end to the bottom end of the vertical lift member 9A by a third pin at third pivot point 15A, and is pivotably attached at its outer end to a lower portion of the collar 6 by a fourth pin at fourth pivot point 17, common to both right and left sides of the invention.

The collar 6 has a hollow cylindrical inner surface (not visible in this view, see FIGS. 8-11) and is supported by a vertical post 18 that fits within it. Across the cylindrical inner surface of the upper portion 5 is a rigid rod (not visible in this view) that contacts the top of the post 18 and serves as a bearing to hold the weight of collar 6 and the other parts listed above, as well as the food being cooked. Conveniently, this rigid rod can be part of the fulcrum pin 4.

The height of the grill rack 8 above the fire basin 2 is determined by the length of the normal between the handle 7 and the parallelogram bar 14A, which in turn is governed by the position of the ratchet bar 19A.

Figure 3:
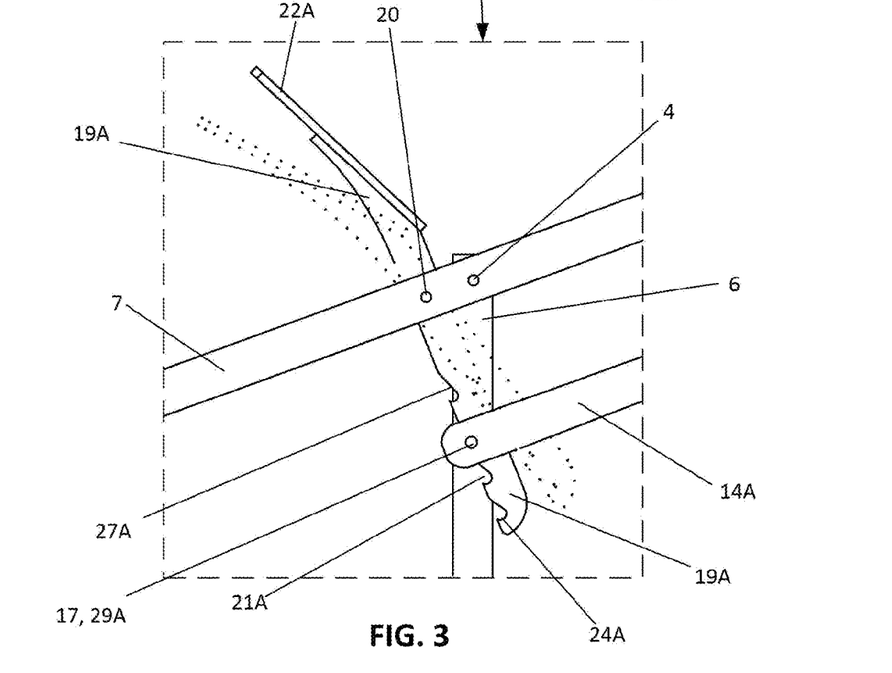
FIG. 3 is an inset from FIG. 2.

FIG. 3 is an enlargement of the dashed rectangular inset shown in FIG. 2, better showing the details of the ratchet bar 19A and its movement. The ratchet bar 19A pivots about a ratchet pin at a fifth pivot point 20 through the handle member 3, located to the left of the fulcrum pin 4. The ratchet pin at the fifth pivot point 20 is raised and lowered, respectively, by raising and lowering handle 7. The weight of the grill rack and other parts to the right of vertical collar 6 urges the fifth pivot point 20 upward (clockwise about the fulcrum pin 4 in this view) and the weight of the ratchet bar 19A to the right of the fifth pivot point 20 urges the ratchet bar 19A clockwise about the fifth pivot point 20 in this view so that one of the four shaped notches 21A on the left side of the ratchet bar 19A (in this view, the third such notch from the bottom of the ratchet bar 19A) engages a pawl (not visible in this view) fixed to the lower portion of the collar 6. This pawl is part of a rod 29A perpendicular to the plane of the sheet at the fourth pivot point 17, which is fixed to the collar 6 and about which the parallelogram bar 14A can rotate in a vertical plane. The pawl occupies a space (not visible in this view) between the collar 6 and the parallelogram bar 14A that allows one of the four shaped notches 21A to grip the pawl. The shape of the notches 21A includes hooks 24A at the bottom of each notch 21A. The hook 24A resists upward movement of the ratchet bar 19A against the pawl, and consequently resists inadvertent disengagement of a notch 21A from the pawl under the weight of the grill rack. The shape of the notches 21A further includes a smooth upper part 27A of each notch 21A. This feature allows easy release of the ratchet bar 19A from the pawl when the handle 7 is pressed down so as to raise the grill rack.

With downward pressure on the handle 7, a tab 22A at the top of the ratchet bar 19A can be pressed to the left, moving the ratchet bar 19A to a new position (dotted line) thereby releasing the notch from the pawl and allowing the handle 7 to be raised or lowered. When the tab 22A is released, the weight of the ratchet bar 19A allows another shaped notch on the ratchet bar 19A to grip the pawl.

Figure 4:
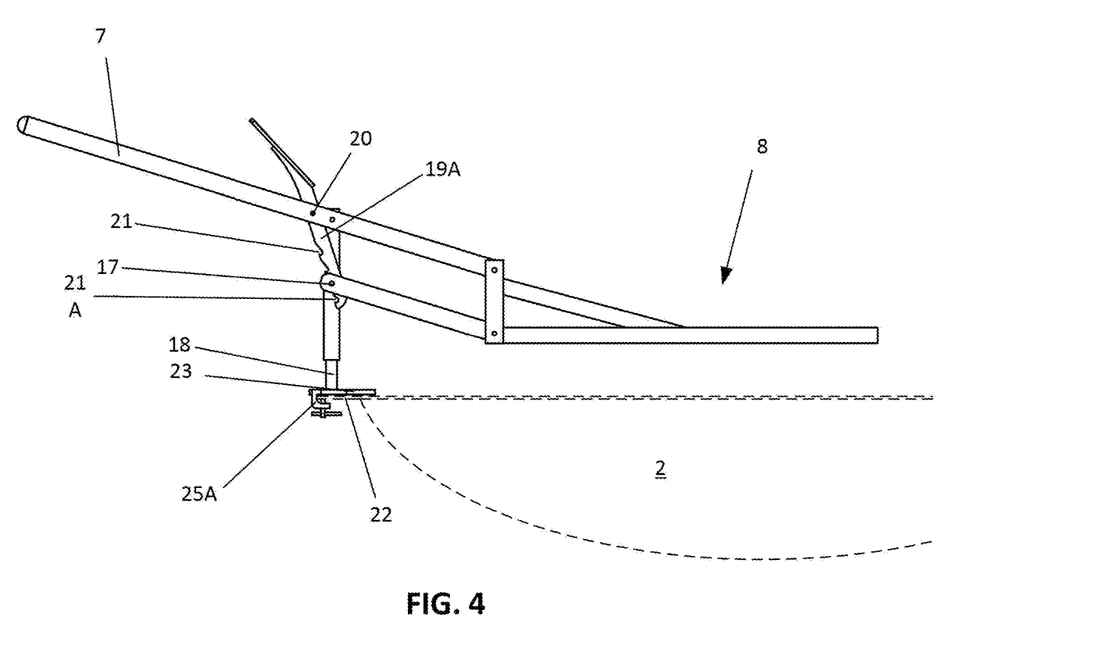
FIG. 4 is a side view of the preferred embodiment at a different height setting.

FIG. 4 is a side view of the invention at a different height setting. Handle 7 has been raised, allowing another of the four shaped notches 21A, the second from the bottom of the ratchet bar 19A in this view, to grip the pawl at the fourth pivot point 17. The grill rack 8 is now closer to the fire basin 2 than in FIG. 2. In embodiments, means other than this for releasably setting the height of the grill rack 8 relative to the fire basin 2 may be used, such as a rigid prop of adjustable height.

Also visible in this view is a means for the invention to grip a grill, in this case the horizontal lip 22 of the fire basin 2. A horizontal plate 23 fixed to the lower end of the vertical post 18 is placed on top of the lip 22 and clamped to the lip 22 by a clamp 25A. The scope of the present invention includes equivalent means known in the art for fastening a vertical post to another object, whether or not that object has a horizontal flange.

Figure 5:
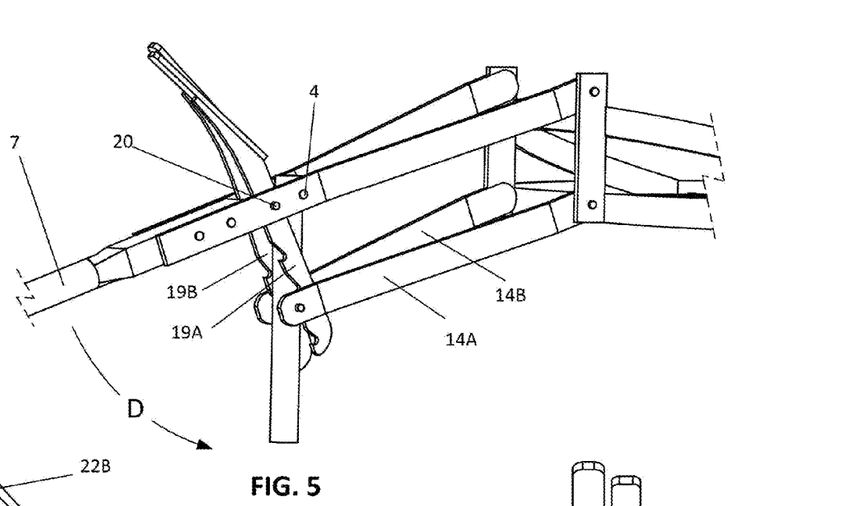
FIG. 5 is a partial top view of the preferred embodiment.

FIG. 5 is a partial oblique view of the preferred embodiment. It shows two ratchet bars 19A and 19B, constructed to rotate independently about fifth pivot point 20 to provide finer vertical placement of the grill rack (not shown in this view). Note that when handle 3 is pressed downward in direction D, the fifth pivot point 20 moves counterclockwise about pivot point 4, and both ratchet bars 19A and 19B move downward.

Figure 6:
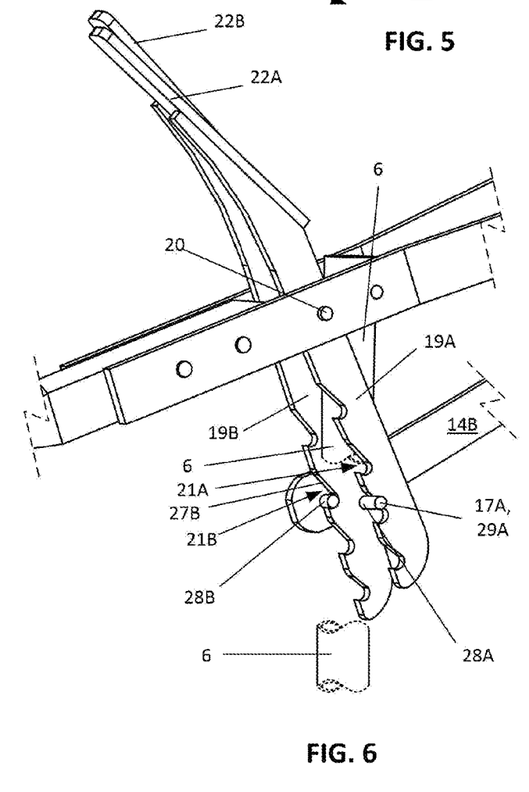
FIG. 6 is a magnification of FIG. 5.

FIG. 6 is a magnification and partial cutaway of FIG. 5. Because ratchet bar 19B (for example) can pivot freely about the fifth pivot point 20, the smooth upper part 27B of each notch 21B can slide downwardly over pawl 28B. The pawls 28A and 28B are attached to opposite sides of the outer surface of collar 6, which is cutaway to better reveal detail. Note that ratchet bar 19B is slidably sandwiched between collar 6 and parallelogram bar 14B. Similarly, ratchet bar 19A is slidably sandwiched between collar 6 and parallelogram bar 14A (removed to show detail). Rod 29 (see FIG. 3) protrudes outwardly from collar 6 in two parts 29A (visible here) and 29B (hidden behind parallelogram bar 14B) sufficiently on both sides to provide pawls 28A and 28B on either side of the collar 6 as well as pivot points 17A (and 17B, not visible) for the parallelogram bars.

Note especially that the hooks 24A along the left edge of bar 19A are arrayed at intervals farther up the left edge of bar 19A than the corresponding hooks 24B on bar 19B by half the distance between the hooks. This means that as the handle 7 is pressed down, a hook on one ratchet bar is released from the pawl on its side at the same moment a hook on the other ratchet bar is in position to grip the opposing pawl. Thus, the control of the height of the grill rack is twice as precise as it would be if only one ratchet bar were used. When the handle is released, the weight of the grill rack causes the upward motion of the ratchet bars to stop at the nearest hook regardless of which side it is on. Upward adjustment of the grill rack height requires only downward pressure on the handle 7. This action gives the tabs the appearance of paddling in and out as the notches slide downwards over the pawls. To adjust the grill rack height to a lower position, it is only necessary to support the weight of the grill rack using the handle, press the tabs 22A and 22B outwardly, gently lower the grill rack to the desired height, and release the tabs.

Figure 7:
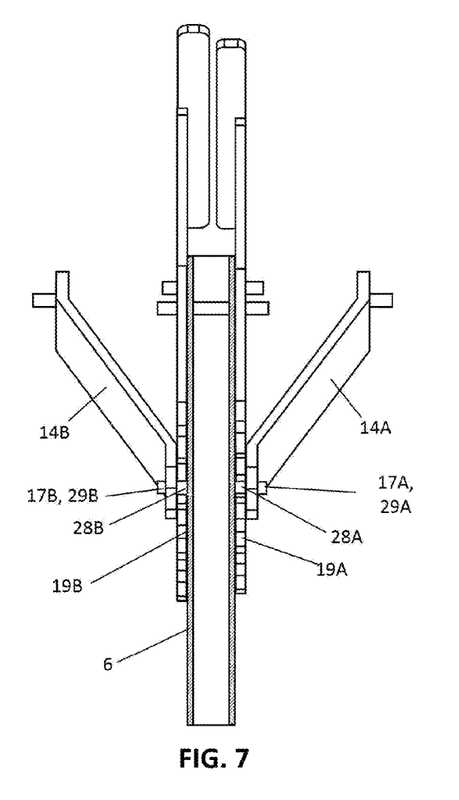
FIG. 7 is a partial front view of the preferred embodiment.

FIG. 7 is a partial front view of the preferred embodiment, showing a cross-section of collar 6 and emphasizing that pawls 28A and 28B are fixed to the outside of the collar and are part of rods 29A and 29B, respectively. It also shows more clearly that the ratchet bars 19A and 19B are sandwiched between the outside perimeter of the collar 6 and the parallelogram bars 14A and 14B.

Figure 8:
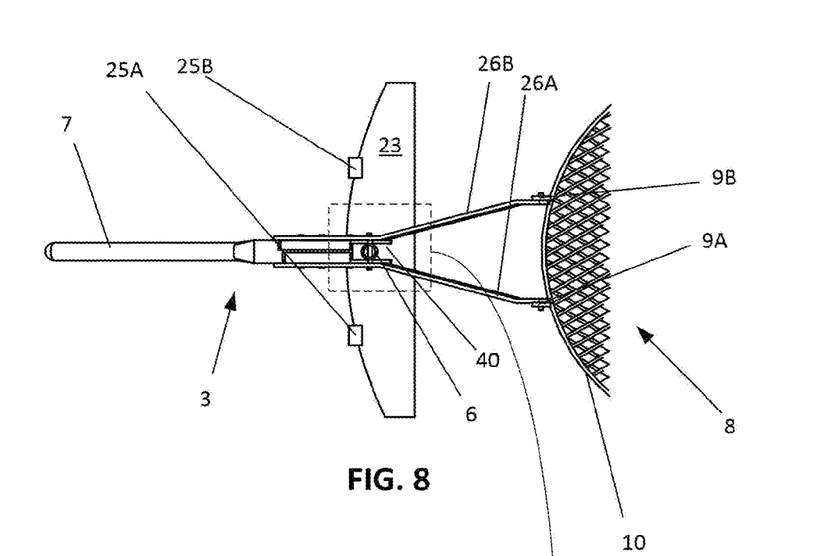
FIG. 8 is a partial top view of the preferred embodiment.

FIG. 8 is a partial top view of the preferred embodiment. It shows that in the preferred embodiment, the right end 26 of the handle member 3 is forked for horizontal stability. There are therefore two vertical lift members 9A and 9B. The handle member 3 is also split near its midpoint so that the vertical collar 6 occupies a space 40 within the handle member 3. This view also shows the horizontal plate 23 and the two clamps 25A and 25B.

Figure 9:
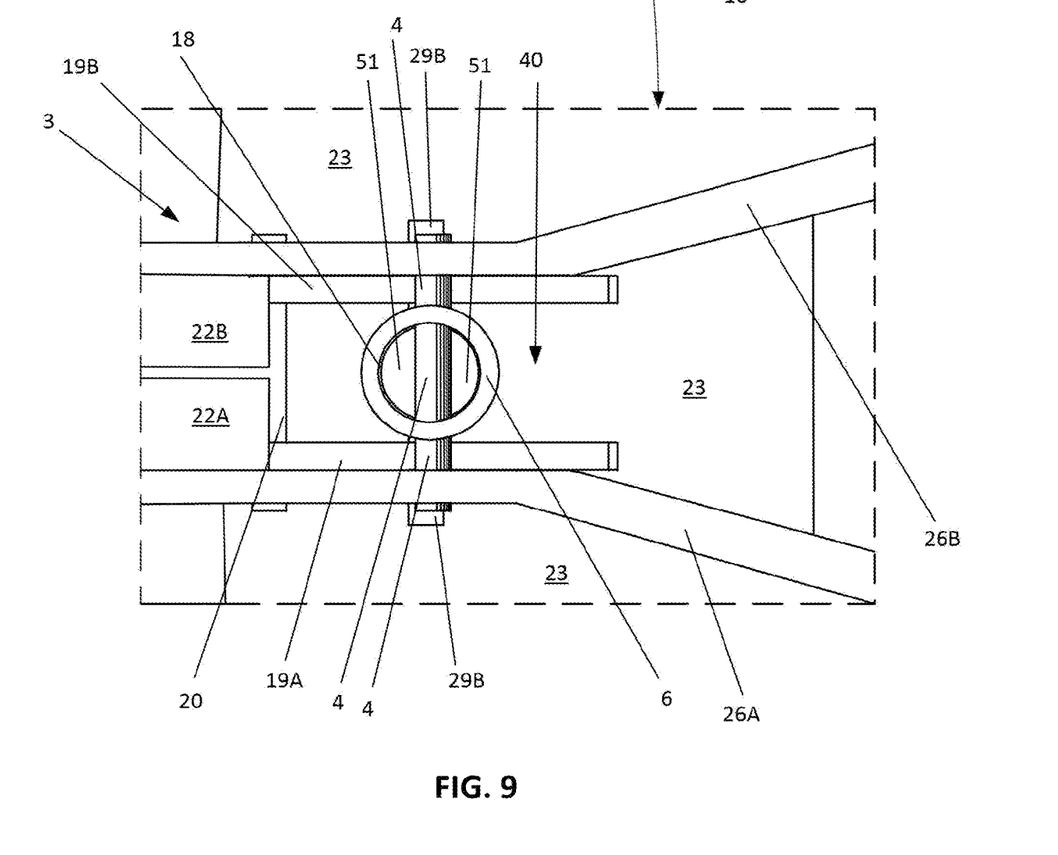
FIG. 9 is a view of an inset from FIG. 8.

FIG. 9 is a view of an inset from FIG. 8 more clearly showing parts of a top view of detail surrounding and within the collar 6. The entire weight of the handle portion 3 and grill rack 8 (not shown in the inset) is borne by fulcrum pin 4. Fulcrum pin 4 passes through the vertical collar 6 and can be fixed to either the handle portion 3 or the vertical collar 6, but not both, thus allowing the handle portion 3 to rotate in a vertical plane (normal to the sheet plane). The top of the vertical post 18 has a flat horizontal face 51. In embodiments, a semi-cylindrical groove (see FIG. 11) may be provided in this flat horizontal face 51 of the vertical post 18 to provide a detent in which fulcrum pin 4 may rest.

Also shown here is top views of ratchet bars 19A and 19B on either side of the vertical collar 6, both of which pivot about the fifth pivot point 20 (see FIG. 3). Top views of part of right tab 22A and 22B are also shown here, each attached to the tops of ratchet bars 19A and 19B. The ratchet bars 19A and 19B, together with tabs 22A and 22B, can thus pivot independently about fifth pivot point 20. Also shown in FIG. 9 are the forked right ends 26 of the handle member 3, as well as a portion of the horizontal plate 23.

Figure 10:
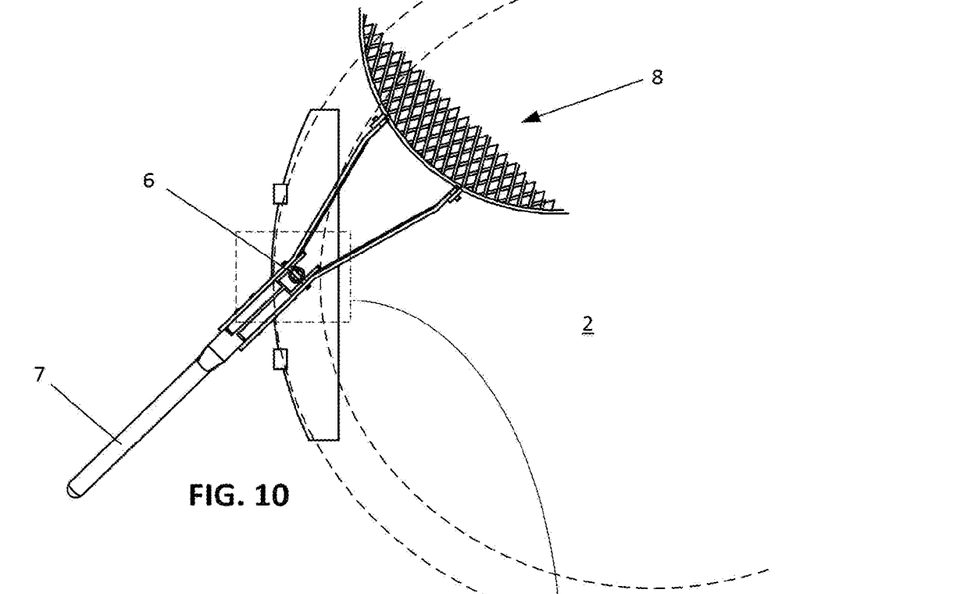
FIG. 10 is a partial top view of the preferred embodiment of the invention at a different azimuthal angle.

FIG. 10 is a partial top view of the invention moved to a different azimuthal angle from FIG. 8. Handle 7 has been rotated counterclockwise about collar 6 in this view to move the grill rack 8 away from the fire in the fire basin 2 (shown here in dashed lines to indicate environmental structure).

Figure 11:
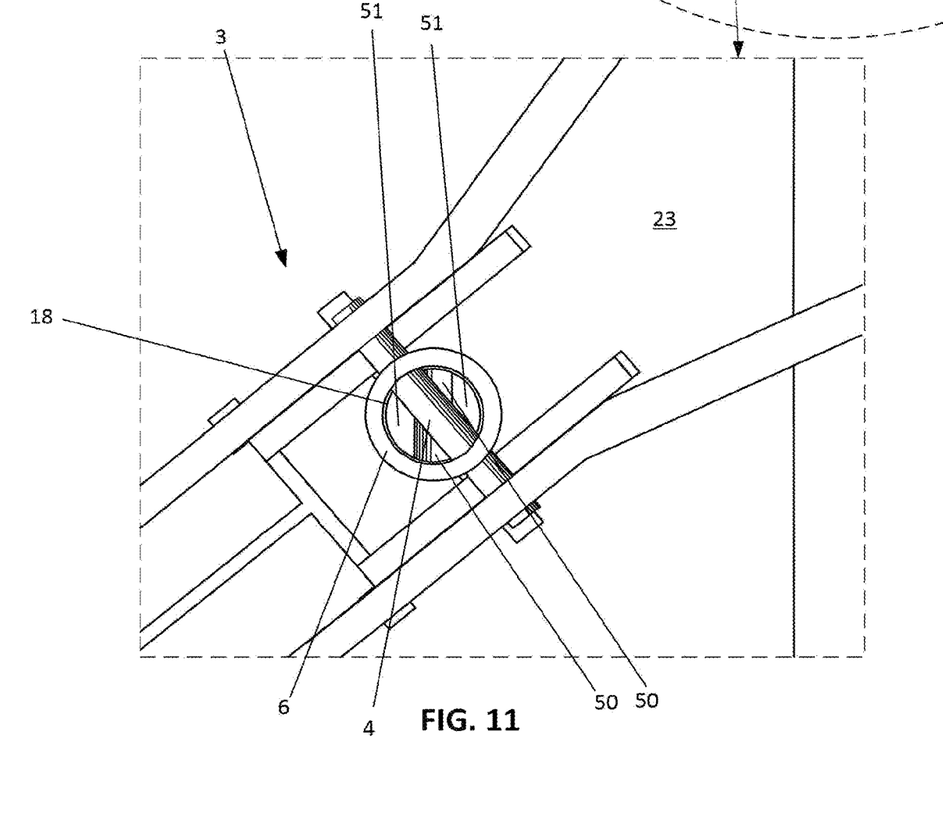
FIG. 11 is a view of an inset from FIG. 8.

FIG. 11 is a view of an inset from FIG. 10. In a second embodiment shown here, a semi-cylindrical groove 50 has been created in the horizontal upward face 51 of the top of the vertical post 18, which remains stationary because the vertical post 18 is fixed to the horizontal plate 23. The counterclockwise rotation of the handle member 3 has caused the fulcrum pin 4 to leave the semi-cylindrical groove 50. By moving out of the semi-cylindrical groove 50, the fulcrum pin 4 rises a small amount (toward the viewer in this view) to rest on the horizontal upward face 51. Because of this rise, the semi-cylindrical groove 50 acts as a detent to center the grill rack over the fire basin 2 in its most stable state. Rounding of the top edges of the semi-cylindrical groove 50 will make it easier for the fulcrum pin 4 to release from, and re-enter, the semi-cylindrical groove 50. Other detent means that operate in an equivalent manner are within the scope of this invention.

In embodiments, the grill top in its most basic form need not have a hollow cylinder around a central post. A second vertical member may be substituted for the hollow cylinder, with means other than cooperating detents to support it while still allowing the two to revolve about each other in a horizontal plane, with or without a detent to urge the grill rack into a position over the fire basin.

Similarly, there need not be a specific vertical lift member 9 attached to the periphery 10 of the grill rack 8 as shown in FIG. 2. In embodiments, this invention only requires that the right ends of the handle and the parallelogram bar be attached to some vertical portion of the grill rack in parallel relation. For that reason, this invention includes embodiments in which the parallelogram bar is positioned above the handle, as for example if in FIGS. 2 and 3 the positions of the handle 7 and the parallelogram bar 14 were to be swapped. The modifications in these last two paragraphs should also be considered equivalent to the structures described earlier.

The invention claimed is:

1. A grill top, comprising:
   a substantially vertical post;
   the vertical post comprising an axis, an upper end, and a lower end;
   a substantially vertical collar comprising an upper portion and a lower portion;
   the vertical collar comprising a substantially vertical hollow inner surface and a cylindrical outer surface;
   the vertical hollow inner surface fitting slidably over the vertical post;
   the lower portion having a first pawl affixed to the cylindrical outer surface and a second pawl affixed to the cylindrical outer surface diametrically opposite to the first pawl;
   a handle member comprising a handle end, a middle portion, and a rack end;
   the middle portion comprising a fulcrum rotatably attached to the upper portion of the vertical collar at a first pivot point;
   at least one parallelogram bar comprising a first bar end and a second bar end;
   a substantially horizontal rack comprising a periphery and at least one vertical lift member attached to the periphery;
   the at least one vertical lift member comprising a top end and a bottom end;
   the rack end of the handle member being rotatably attached to the top end of the at least one vertical lift member at a second pivot point;
   the first bar end being rotatably attached to the bottom end of the at least one vertical lift member at a third pivot point a first distance vertically below the second pivot point; and
   the second bar end being rotatably attached the lower portion of the vertical collar at a fourth pivot point located the first distance below the first pivot point;
   a first ratchet bar comprising a first upper portion and a first vertical edge;
   the first upper portion of the first ratchet bar being pivotably attached to a fifth pivot point on the handle member located between the handle end and the fulcrum;
   the first vertical edge extending below the fifth pivot point and comprising a series of shaped first notches;

each of the shaped first notches comprising a first smooth upper part and a first hook below each first smooth upper part along the first vertical edge;
each first hook being shaped to grip the first pawl;
each first smooth upper part being shaped to release the first pawl;
a second ratchet bar comprising a second upper portion and a second vertical edge;
the second upper portion of the second ratchet bar being pivotably attached to a fifth pivot point on the handle member located between the handle end and the fulcrum;
the second vertical edge extending below the fifth pivot point and comprising a series of shaped second notches;
each of the shaped second notches comprising a second smooth upper part and a second hook below each second smooth upper part along the second vertical edge;
each second hook being shaped to grip the second pawl;
each second smooth upper part being shaped to release the second pawl;
the first and second ratchet bars being so positioned on the fifth pivot point that the second hooks are positioned vertically halfway between the first hooks.

2. The grill top of claim 1, in which:
said first and second vertical edges face toward said handle end and away from said rack end.

3. The grill top of claim 2, wherein:
said first and second upper portions of said first and second ratchet bars comprise first and second tabs extending upwardly from said fifth pivot point.

4. A grill top, comprising:
a means for adjusting the height of a rack over a grill, comprising:
a substantially vertical member comprising an upper portion and a lower portion;
the lower portion having a first pawl affixed to one side of the vertical member and a second pawl affixed to the opposite side of the vertical member;
a handle member comprising a handle end, a middle portion, and a rack end;
the middle portion comprising a fulcrum rotatably attached to the upper portion of the vertical member at a first pivot point;
means for maintaining the rack in a horizontal plane at all heights above the grill;
means for securing the rack at a plurality of heights above the grill, comprising:
first and second ratchet bars;
the first ratchet bar comprising a first upper portion and a first vertical edge;
the first upper portion of the first ratchet bar being pivotably attached to a fifth pivot point on the handle member located between the handle end and the fulcrum;
the first vertical edge extending below the fifth pivot point and comprising a series of shaped first notches;
each of the shaped first notches comprising a first smooth upper part and a first hook below each first smooth upper part;
each first hook being shaped to grip the first pawl;
each first smooth upper part being shaped to release the first pawl;
the second ratchet bar comprising a second upper portion and a second vertical edge;
the second upper portion of the second ratchet bar being pivotably attached to the fifth pivot point on the handle member;
the second vertical edge extending below the fifth pivot point and comprising a series of shaped second notches;
each of the shaped second notches comprising a second smooth upper part and a second hook below each second smooth upper part;
each second hook being shaped to grip the second pawl;
each second smooth upper part being shaped to release the second pawl;
the first and second ratchet bars being so positioned on the fifth pivot point that the second hooks are positioned vertically halfway between the first hooks.

5. The grill top of claim 4, wherein:
said means for maintaining the rack in a horizontal plane at all heights above the grill comprises:
at least one parallelogram bar comprising a first bar end and a second bar end;
a substantially horizontal rack comprising at least one vertical lift member;
the at least one vertical lift member comprising a second pivot point vertically disposed above a third pivot point;
said rack end of said handle member being rotatably attached to said second pivot point;
the first bar end being rotatably attached to a third pivot point a first distance vertically below said second pivot point; and
the second bar end being rotatably attached said lower portion of said vertical first member at a fourth pivot point the first distance below said first pivot point.

6. The grill top of claim 5, in which:
said first and second vertical edges face toward said handle end and away from said rack end.

7. The grill top of claim 6, wherein:
said first and second upper portions of said first and second ratchet bars comprise first and second tabs extending upwardly from said fifth pivot point.

8. The grill top of claim 4, wherein:
said means for maintaining the rack in a horizontal plane at all heights above the grill comprises:
at least one parallelogram bar comprising a first bar end and a second bar end;
a substantially horizontal rack comprising at least one vertical lift member;
the at least one vertical lift member comprising a second pivot point vertically disposed below a third pivot point;
said rack end of said handle member being rotatably attached to said second pivot point;
the first bar end being rotatably attached to a third pivot point a first distance vertically above said second pivot point; and
the second bar end being rotatably attached said lower portion of said vertical first member at a fourth pivot point the first distance above said first pivot point.

9. The grill top of claim 8, in which:
said first and second vertical edges face toward said handle end and away from said rack end.

10. The grill top of claim 9, wherein:
said first and second upper portions of said first and second ratchet bars comprise first and second tabs extending upwardly from said fifth pivot point.

* * * * *